(12) United States Patent
Jones

(10) Patent No.: US 6,882,645 B2
(45) Date of Patent: Apr. 19, 2005

(54) APPARATUS AND METHOD FOR SEQUENCING MEMORY OPERATIONS IN AN ASYNCHRONOUS SWITCH FABRIC

(75) Inventor: Ian W. Jones, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 811 days.

(21) Appl. No.: 09/839,704

(22) Filed: Apr. 20, 2001

(65) Prior Publication Data

US 2002/0131435 A1 Sep. 19, 2002

Related U.S. Application Data

(60) Provisional application No. 60/275,585, filed on Mar. 13, 2001.

(51) Int. Cl.$^7$ ............................................. H04I 12/28
(52) U.S. Cl. ..................... 370/392; 370/394; 711/105; 340/2.28
(58) Field of Search ............................... 370/382, 392, 370/394, 412, 420, 422, 535; 711/100, 149, 148, 147, 105; 340/2.28

(56) References Cited

U.S. PATENT DOCUMENTS 5,278,969 A * 1/1994 Pashan et al. ............... 395/425
6,192,049 B1 * 2/2001 Sohraby ...................... 370/389
6,466,590 B1 * 10/2002 Park et al. ................... 370/535

* cited by examiner

Primary Examiner—Duc Ho
(74) Attorney, Agent, or Firm—Park, Vaughan & Fleming, LLP (57) ABSTRACT

One embodiment of the present invention provides a system that facilitates implementing a memory mechanism within an asynchronous switch fabric. The system includes a memory device, which does not preserve first-in, first-out semantics such as a random access memory or a stack. The system also includes a data destination horn, for routing data from a trunk line to a plurality of destinations. The memory device is one destination of the plurality of destinations. The system further includes a data source funnel, for routing data from a plurality of sources into the trunk line. The memory device is a source of the plurality of sources.

20 Claims, 9 Drawing Sheets

APPARATUS AND METHOD FOR SEQUENCING MEMORY OPERATIONS IN AN ASYNCHRONOUS SWITCH FABRIC

RELATED APPLICATIONS

This application hereby claims priority under 35 U.S.C. §119 to a Provisional Patent Application entitled, "Apparatus and method for sequencing memory operations in an asynchronous switch fabric," filed Mar. 13, 2001 by inventor Ian W. Jones (Application No. 60/275,585).

The subject matter of this application is related to the subject matter in a non-provisional application by inventors Ivan E. Sutherland, William S. Coates and Ian W. Jones, entitled "Switch Fabric For Asynchronously Transferring Data Within A Circuit," having Ser. No. 09/685,009, and filing date of Oct. 5, 2000.

BACKGROUND

1. Field of the Invention

The present invention relates to the design of digital circuits. More specifically, the present invention relates to an apparatus and a method for sequencing memory operations to and from memory devices connected to an asynchronous switch fabric. Example memory devices are random access memories (RAMs) and last-in, first-out (LIFO) memories also known as stack memories.

2. Related Art

It is often necessary in computing and communication equipment to send data from many sources to many destinations. This need appears in the central processing unit of computer systems where information may flow: from a register file to any one of a number of arithmetic or logical elements or to a memory controller; from one arithmetic element to another; or from an arithmetic element or memory controller to the register file. This need also appears in the input-output systems of computers where information must flow between and among various units, including processors, memories and secondary storage devices.

One common means for satisfying this need is known as a bus. A bus consists of a number of wires that extend between all communicating units. Each unit that wishes to send data places the data on the data bus so that any of the receiving units may receive it. Such bus structures are widely used both inside central computing units and in the input-output systems for computers.

There are a number of drawbacks to such a bus structure. First, each destination must attach some transistors to the bus in order to sense the state of the bus, and because there are many destinations, these sensing transistors collectively represent a large electrical load. Second, each source must attach driving transistors to the bus to drive data onto the bus, and even though all but one such drive transistor per bus wire is shut off when the bus changes state, the many inactive drive transistors connected to the bus also place considerable electrical load on the wires in the bus. Third, the bus wires themselves tend to be physically long and thus intrinsically represent further electrical load. The combined load on the bus wires from drivers, receivers and the wires themselves results in communication paths that are generally slow in comparison with other logical structures. Furthermore, only a single piece of information can flow per bus cycle, which limits the achievable communication rate.

One alternative to bus structure is the cross-bar switch. For each bit of communication, a cross-bar switch provides a grid of "horizontal" and "vertical" conductors, wherein each source drives a horizontal conductor and each destination senses the state of a vertical conductor. At each intersection of horizontal and vertical conductors in the cross-bar, a transistor or other switching element connects the conductors. This grid structure is repeated for as many bits as are to be transmitted at any one time.

The cross-bar switch has several advantages over the bus structure. First, each source drives only the capacitive load on the horizontal wire, which amounts to one receiving switch mechanism per destination. The many drivers that would have to be connected to each wire in a bus structure are here replaced by a single driver on the source wire. Because this driver drives only the source wire and its switches, it can be as large as desired, and can thus drive its load very quickly. Moreover, the wire for each destination has a load of only one sensing transistor, though it may be connected to many inactive intersection switches. Thus, the cross-bar switch divides the inherent loading in a simple bus into two parts, the horizontal wire pathway, and the vertical wire pathway, thereby speeding up the flow of information.

A further advantage of the cross-bar switch is that it can deliver several pieces of information concurrently. Several different sources can each deliver information to several different destinations at the same time provided no two sources and no two destinations are the same, because each such communication uses a different switch to connect its horizontal source wire to its vertical destination wire. That is, two or more switches may be active at any one time provided that no two switches in the same row or in the same column are active.

The disadvantage of the cross-bar switch lies in its large number of switching transistors. While each bit of the bus structure has only one drive element per source and one receiving element per destination, the number of switch points in a cross-bar switch is the product of the number of sources and the number of destinations. Not only do these many switch points require chip area and consume power, but also they require control information. The difficulty of controlling so many switches turns out to be a disadvantage in implementation.

A second alternative to the bus structure is to use point-to-point wiring between each source and each destination. Point-to-point wiring is returning to more common use in modem systems because it simplifies the electrical properties of the transmission lines used. In a point-to-point system, each destination must be prepared to receive signals along transmission lines that begin at each source, so that the number of receivers at each destination equals the number of sources. Similarly, each source must be able to send information to each destination. Thus, the number of sending and receiving mechanisms required is the same as the number of switch points in the cross-bar switch. The point-to-point mechanism can be thought of as a physical rearrangement of the cross-bar switches, wherein the horizontal and vertical wires in the cross-bar have become very short, and each switch at an intersection is replaced by a transmission line running from one source to one destination.

The point-to-point mechanism can be very fast. However, like the cross-bar it suffers from the need for a great deal of control information. Moreover, it is generally hard to find space for the large number of transmission lines required.

A third alternative to simple busses is to use some kind of network interconnection scheme. The Ethernet for example, is essentially a bus structure that uses itself for control, and transmits data serially. Other networks, including those with complex computer-controlled switches are well known and widely used. Such switches appear, for example, in the Internet. Generally, however, their control is very complex and their throughput is much less than that of an equivalent bus structure.

In an effort to overcome these problems, designers have created a structure that provides high throughput through a tree-structured multiplexing-and-amplifying system (see the related application by inventors Ivan E. Sutherland, William S. Coates and Ian W. Jones, entitled "Switch Fabric For Asynchronously Transferring Data Within A Circuit," having Ser. No. 09/685,009, and filing date of Oct. 5, 2000). Because the stray capacitance of any wire in commonly used circuitry (such as CMOS) can store data, it is possible to store many values in a multiplexer tree structure and additional values in an amplification tree structure. The invention in the related application uses this storage to permit several communications to proceed concurrently in different parts of the structure. In this related invention, a new communication can be launched as soon as the wires it requires are no longer needed for the previous communication.

Instead of using 7a single-level bus structure, one embodiment in the related application uses a multiple-level structure. Consider, for example, a single-level bus structure for 64 sources and 32 destinations. Each of the 64 sources must have suitable drive transistors that can put data onto the bus. Thus, the drive structure to the bus is, in effect, a multiplexer with 64 inputs. Similarly, each of the 32 destinations must have a sensing transistor connected to the bus so that any of them can accept data values from the bus. Thus, the output structure is, in effect, a 32-way fan-out from the bus to the 32 destinations.

In CMOS technology, multiplexers with many inputs can be broken into tree structures of multiplexers with fewer inputs. Although such tree structures of multiplexers contain more levels of logic than a single multiplexer, they can nevertheless be faster because each level of logic is simpler. In fact, in the book *Theory of Logical Effort*, by Ivan Sutherland, Bob Sproul and David Harris, Morgan Kaufmann Publishers, Inc., San Francisco, Calif., 1999, chapter 11.4.1 teaches that in CMOS circuits the fastest multiplexing structure is a tree in which each level joins approximately four inputs. Thus, the 64-input multiplexer of the example might better be replaced with a three-level tree. The first level gathers groups of four sources together onto several short "level-1" busses; in the example there would be 64/4=16 such level-1 busses. The second level of 4-input multiplexers gathers together groups of four such level-1 busses into somewhat longer "level-2" busses; the example requires 16/4=4 such level-2 busses. Finally, a third level of 4-input multiplexers gathers these level-2 busses together into a single "level-3" bus, which need be only long enough to reach all of the inputs from the nearest part of the level-2 busses.

Furthermore, a series of amplifiers can be used to deliver a particular signal to many destinations. Such a set of amplifiers can easily be arranged into a tree structure, much like the multiplexer tree but in reverse. In the example of 32 destinations, the information on the level-3 bus might be amplified and sent to two level-4 busses. Four amplifiers on each such level-4 bus might amplify the signal again, delivering it to a total of eight level-5 busses. Again, four amplifiers on each level-5 bus might be used to amplify the signal, each delivering its output to four destinations. In spite of the fact that more stages of amplification are involved, such structures are faster than a single stage of amplification can be.

These multi-level structures have an advantage of speed, but they require extra wires to accommodate the different bus levels. Thus, the design of such a structure is always a compromise between the desired speed and the space cost of extra wiring.

A further point must be made here: it requires energy to change the value on any wire in a CMOS system. Thus, delivering information to all destinations always, will consume more power than would be required to deliver the same information only to its intended destination, leaving static the state of wires that do not participate in that particular communication. The invention in the related application takes advantage of this potential saving in power.

Returning to the example of 64 sources, at the same time that the level-2 bus delivers information to the level-3 bus, a new source can deliver information to the level-1 bus provided the new information is kept from overwriting the previous command data. By overlapping in time the actions of different levels, the structure can achieve higher data throughput rates. In fact, the throughput of such a structure is limited mainly by its ability to turn the multiplexers on and off quickly enough.

Furthermore, consecutive communications from the same source to the same destination can overlap in time. For example, as soon as the first has cleared the level-1 bus, the second may use that bus. Naturally, a small time gap between communications is required; in the limit, however, there may be as many communications underway as there are levels in the tree-structures.

Similarly, one can store information in the structure that amplifies and delivers data from the main bus to the destinations. Such an amplification structure consists of several levels of amplification, each fanning out to a next set of amplifiers and finally to the destinations themselves. Each such level can also serve as a place to store information. Thus, for example, one can overlap in time the delivery of a data item from the level-3 bus to the first level of amplification, the level-4 bus, while delivering the previously transmitted data item from the level-6 bus to its final destination.

A further advantage of the invention in the related application is that it can operate asynchronously in time. For example, a data element launched from a particular source to a particular destination can flow along a certain path through the multiplexing structure, through the highest-level bus—also known as the "trunk"—and thence through the amplifying structure to its destination. While it is in flight, some other data element launched from a different source and at an unrelated time may take its own route to its own particular destination. Two such communications will not interfere with each other except where they require a common communication path. The invention in the related application permits each to proceed as far as it can without interfering with others, dealing with such potential interference by controlling only the sequence in which the conflicting communication actions may use the common path.

Yet a further aspect of the invention in the related application involves automatically stalling the communication mechanism when a source is not ready to provide information or a destination is not ready to receive it. Because the interconnection structure contains storage at every level, actions already underway may proceed without waiting for a stalled source or destination irrelevant to their action. Delay in one source need not retard the communications emanating from a different source, nor need delay in accepting previous data at a destination retard delivery to other destinations, except, of course, as such other communications require the use of pathways common to the stalled communication.

Naturally, the control of such a switching structure with internal storage presents its own set of challenges. One part of the invention described in the related application involves a simple set of control structures, which, also configured hierarchically, asynchronously control the concurrent flow of data through the switching structure from source to destination. The "switching directive" for each communication action includes a "source address," indicating the particular source for this communication and a "destination address," indicating the particular destination that is to receive this data item. A stream of such address pairs thus controls the dynamic operation of the data-switching network of the invention in the related application.

The asynchronous nature of this switching structure is an advantage when addressing elements with first-in, first-out (FIFO) semantics. If a read instruction appears before data has been written to a FIFO element, the instruction simply stalls until the data has been written. Additionally, the reads and writes to a FIFO element will always be ordered in the sequence directed by the instruction stream.

However, reading from and writing to elements that do not preserve FIFO semantics, such as a random access memory (RAM) device or a device with last-in, first-out (LIFO) semantics such as a stack, present a problem in this asynchronous architecture. The problem arises because the read and write ports of these devices are connected to different locations in the switch fabric—the read port of the device is connected as a data source for the switch fabric, while the write port of the device is connected to a destination address of the switch fabric—and the switch fabric does not preserve instruction order at these different locations.

This can cause what are known as read-after-write hazards and write-after-read hazards. For example with a RAM device, a read following a write instruction to the same memory address might return the previous data rather than the newly written data. Similarly, if read/write instruction order is not preserved, then a write following a read instruction to the same memory address could cause the read to return the newly written data value rather than the previous data value in that memory location as the instruction order indicated.

Consider, for example, that a push instruction has previously written data to the stack. While these data are on the stack, assume that a push instruction followed closely by a pop instruction is in the instruction stream. It is possible for the pop to arrive at the stack element prior to the associated push instruction, thereby popping the wrong data from the stack. Such non-deterministic behavior can be undesirable in many applications of the switch fabric.

What is needed is an apparatus and a method to preserve instruction order of reads and writes to memory devices connected to the asynchronous switch fabric.

SUMMARY

One embodiment of the present invention provides a system that facilitates implementing a memory mechanism within an asynchronous switch fabric. The system includes a memory device, which does not preserve first-in, first-out semantics such as a random access memory or a stack. The system also includes a data destination horn, for routing data from a trunk line to a plurality of destinations. The memory device is one destination of the plurality of destinations. The system further includes a data source funnel, for routing data from a plurality of sources into the trunk line. The memory device is a source of the plurality of sources.

In one embodiment of the present invention, the system includes an asynchronous control structure coupled to the data destination horn. The asynchronous control structure is configured to control propagation of data through the data destination horn. The asynchronous control structure is additionally coupled to the data source funnel, and is additionally configured to control propagation of data through the data source funnel. The asynchronous control structure uses a destination address associated with the data destination horn for the memory device to control propagation of data to the memory device. The asynchronous control structure also uses the destination address for the memory device to control propagation of data originating from the memory device.

In one embodiment of the present invention, a read address for the memory device is shared as a write address of the data destination horn for the memory device, so that an order of memory operations for the memory device is identical to an instruction order for the memory device.

In one embodiment of the present invention, a literal value associated with an instruction destined for the memory device specifies either a write operation or a read operation.

In one embodiment of the present invention, the system includes a first-in, first-out storage structure interposed between the memory device and the data source funnel. The first-in, first-out storage structure buffers the data from multiple reads permitting several outstanding reads from the memory to have completed before the data from the first read is delivered into the switch fabric. Use of a FIFO for this buffer ensures that data delivered from the memory device during the read operation will be available to the data source funnel in a same order as delivered from the memory device. Presence of the FIFO permits more concurrency with other operations. For example, a read request to the memory device can be placed early in the instruction stream and then a series of other instructions can be executed while the read takes place. The read data can then be selected in a later instruction when the data is needed. In this way, the later instruction does not need to wait for the read operation to be carried out—the data is already waiting in the FIFO. Note that it is also possible to interpose a FIFO between the memory device and the destination horn.

In one embodiment of the present invention, the system includes an asynchronous control structure coupled to the data destination horn. The asynchronous control structure is configured to control propagation of data through the data destination horn. The asynchronous control structure is additionally coupled to the data source funnel, and is additionally configured to control propagation of data through the data source funnel. The asynchronous control structure uses a source address associated with the data source funnel for the memory device to control propagation of data to the memory device. The asynchronous control structure also uses the source address for the memory device to control propagation of data from the memory device.

In one embodiment of the present invention, a write address for the memory device is shared as a read address of the data source funnel for the memory device, so that an order of memory operations for the memory device is identical to an instruction order for the memory device.

In one embodiment of the present invention, a literal value associated with an instruction for the memory device specifies either a write operation or a read operation.

In one embodiment of the present invention, the system includes a first-in, first-out storage structure interposed between the data destination horn and the memory device.

The first-in, first-out storage structure ensures data delivered from the data destination horn during the write operation will be available to the memory device in a same order as delivered from the data destination horn.

In one embodiment of the present invention, the system provides a method for implementing a memory mechanism within an asynchronous switch fabric, wherein the memory mechanism effects last-in, first-out storage using a memory device. The system accepts data into a data destination horn from a trunk line. The data destination horn routes data to a plurality of destinations. The plurality of destinations includes the memory device. The system addresses the memory device using a destination address within an asynchronous control structure. The destination address is used to store data in the memory device and to recover data from the memory device. The system provides data to a first-in, first-out storage structure from the memory device. In turn, the data source funnel receives data from the first-in, first-out storage structure. Finally, the data source funnel applies the data to the trunk line.

In one embodiment of the present invention, the system provides a method for implementing a memory mechanism within an asynchronous switch fabric, wherein the memory mechanism effects last-in, first-out storage using a memory device. The system accepts data into a data destination horn from a trunk line. The data destination horn routes data to a plurality of destinations. The plurality of destinations includes a first-in, first-out storage. The first-in, first-out storage structure, in turn, provides data to the memory device. The system addresses the memory device using a source address within an asynchronous control structure. The source address is used to store data in the memory device and to recover data from the memory device. The system also provides for receiving data from the memory device at a data source funnel. The data is further applied from the data source funnel to the trunk line.

In one embodiment of the present invention, the apparatus converts the memory device with other than first-in, first-out semantics to into a dual-port device with first-in, first-out semantics so that read/write order hazards are avoided by assigning read and write control to a single port of the ship.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Switching System

Figure 1:
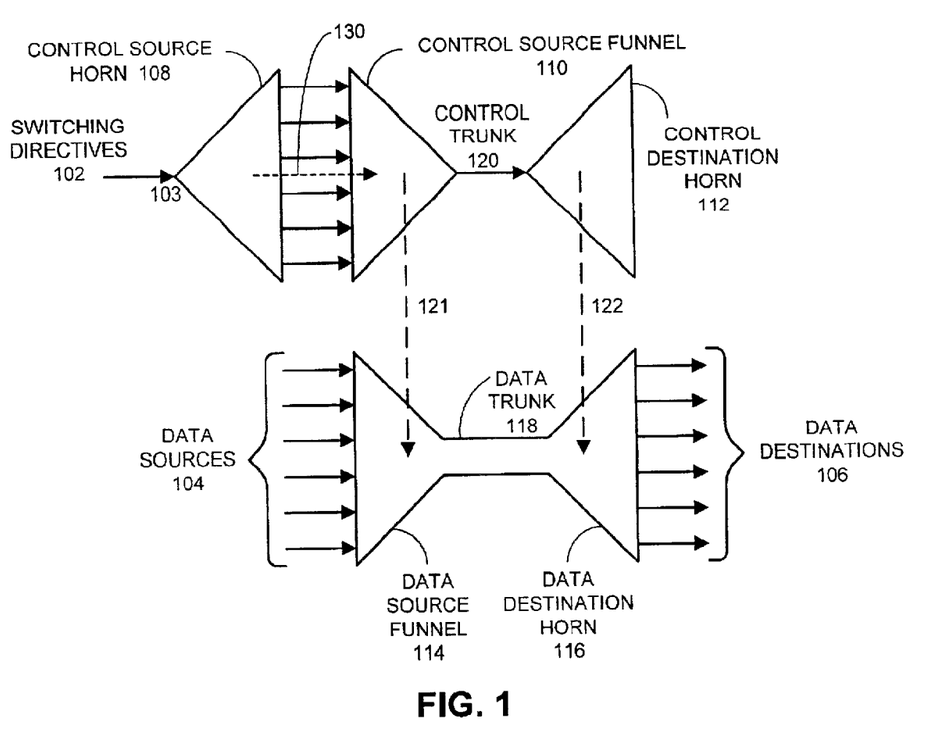
FIG. 1 illustrates a switching system for data in accordance with an embodiment of the present invention.

FIG. 1 illustrates a switching system for data in accordance with an embodiment of the present invention. A data path structure including a data source funnel 114, a data trunk 118, and a data destination horn 116 can carry information from any of the sources 104 to any of the destinations 106. Data source funnel 114 includes a series of multiplexers and includes intermediate storage. Data destination horn 116 includes switched amplifiers and also includes intermediate storage. Both data source funnel 114 and the data destination horn 116 are tree structures. Data trunk 118 connects them. Sources 104 and destinations 106 can include elements with last-in, first-out semantics such as a stack.

To control the data path there is a control source horn 108, a control source funnel 110, a control trunk 120, and a control destination horn 112. Control source horn 108 receives switching directives 102 from its left input 103. Each of these switching directives 102 specifies one communication action by identifying a particular data source and a particular data destination.

Control source horn 108 uses the source identifier to alert the selected data source to send its data into the data source funnel 114. It also delivers to control source funnel 110 information about the route that the information will take through data source funnel 114. Control source funnel 110 uses the routing information provided by the control source horn 108 to control switches in the data source funnel 114 via control wires 121, so as to guide the data along the chosen route to the data trunk 118. The source identifier is consumed level-by-level during this process. The data destination information for the communication from the switching directive passes intact through the control source horn 108 and control source funnel 110 to reach the control trunk 120.

All of the source identifier from the switching directive is used prior to the trunk; following the trunk only a destination identifier is required. The control destination horn 112 uses the destination information from the switching directive to select a route for the data through the data destination horn. Control wires 122 from control destination horn 112 activate the switches in data destination horn 116 to steer the data to its destination along the chosen route.

Because data source funnel 114 and data destination horn 116 contain intermediate storage, several communications may be underway at any one time. Control source horn 108 can accept a new switching directive before completing its processing of the previous directive. Control source funnel 110 can likewise accept fresh routing information from the control source horn 108 before completing its previous task. And likewise, control destination horn 112 can accept new destination instructions before completing a previous operation.

The throughput of the resulting system is very high because of its ability to have more than one communication in flight at a time. It is, in effect, a pipeline that branches out from the switching directive input to the sources, merges back from the sources to the trunk, and then branches out again to the destinations. It is possible to build such a pipeline control using synchronous finite state machines for the control. It is also possible to build and control such a pipeline asynchronously, as will be described further.

The asynchronous form is of particular interest because it can "wait"—i.e. postpone its next local action—an arbitrary length of time whenever required. The control can wait until another switching directive becomes available. It can also wait after control source horn 108 if the selected source is not yet able to deliver the desired data item. It can wait at the trunk if a previous communication occupies the trunk, making it temporarily unavailable for the present communication. It can wait at any of the destinations if the chosen destination is not yet able to accept the proffered data.

Indeed, the asynchronous form of control can wait at any stage of the communication. Suppose, for example, that a series of switching directives all call for delivery of data to the same destination. Suppose further that the chosen destination is not able to receive the data offered. The successive communications will "back up" in the destination horn just as automobiles may back up on a congested freeway. If the number of waiting communications is large enough, the congestion may reach back to the trunk, preventing subsequent instructions from passing through the trunk until the congestion is relieved.

In this case, the control may continue to do useful work by fetching data from the sources appropriate to subsequent communications and advancing those data as far as possible through the source funnel. When the destination blockage clears, communications waiting behind it will advance as fast as the system permits, having already achieved a "head start" and occupying positions part way through the source horn.

FIFO Coupled to Switch Fabric

Before going into detail of how to connect a stack or other memory device to the switch fabric, let's review how a FIFO is connected, and its operation. (See FIG. 3A) The FIFO is accessed by instructions of the form:

mv A→FIFO
mv FIFO→B

Of course, there is nothing to prevent mv FIFO→FIFO which results in rotating the contents of the FIFO by one item, i.e. taking the first item from the FIFO and writing it back to the FIFO making it the last item.

The beauty of FIFO semantics is that FIFO accesses can be reordered to improve overall system performance without affecting the data (providing there is sufficient storage in the switch fabric). For example, the instruction sequence:

mv A→FFO
mv FIFO→W
mv B→FIFO
mv FIFO→X
mv C→FIFO
mv FIFO→Y
mv D→FIFO
mv FIFO→Z will have the same outcome as:

mv A→FIFO
mv B→FIFO
mv C→FIFO
mvD→FIFO
mv FIFO→W
mv FIFO→X
mv FIFO→Y
mv FIFO→Z providing the FIFO can store at least four values. So, for example, if the FIFO is small, the upper ordering of instructions is likely be faster, while for large and slow FIFOs, the lower ordering is likely to be faster.

Stack Coupled to Destination Horn

Figure 2:
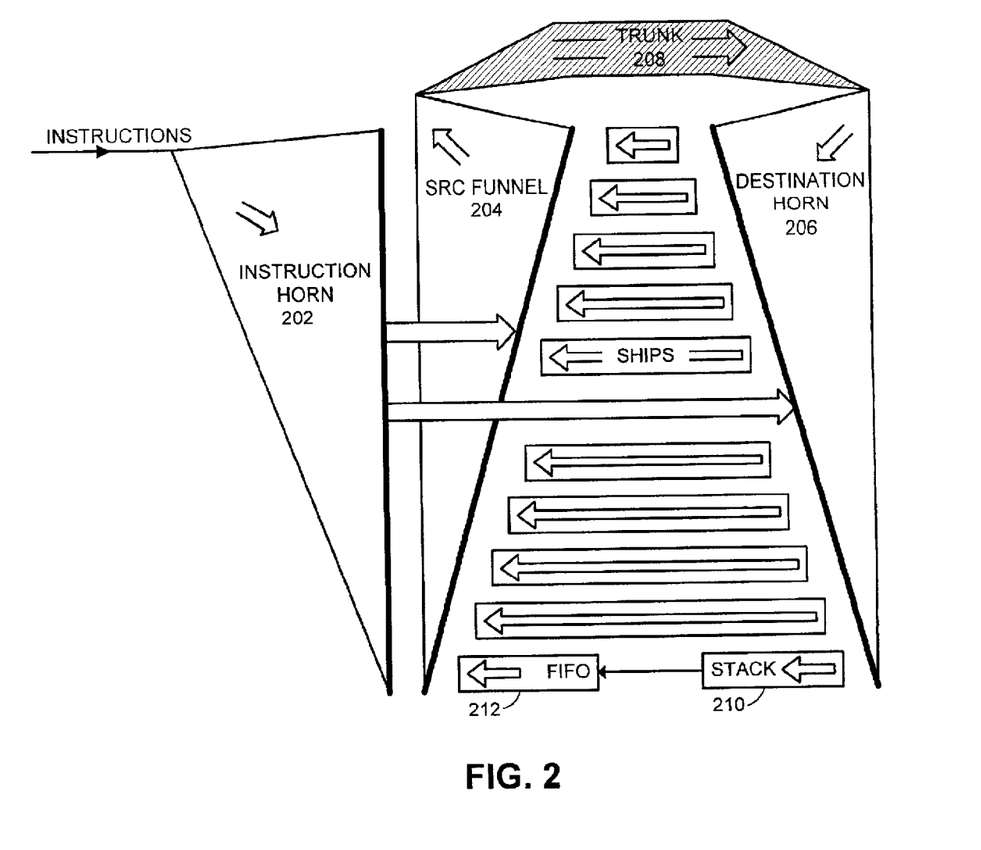
FIG. 2 illustrates stack 210 coupled to destination horn 206 in accordance with an embodiment of the present invention.

FIG. 2 illustrates stack 210 coupled to destination horn 206 in accordance with an embodiment of the present invention. The system includes three modules, instruction horn 202, source funnel 204, and destination horn 206. Processing elements, also called ships, are located between source funnel 204 and destination horn 206. In general, a ship can be any kind of element such as an adder, an accumulator, or as simple as a piece of wire. Trunk 208 couples source funnel 204 to destination horn 206.

In operation, instructions enter instruction horn 202 and are decoded. Instruction horn 202 delivers source selections to source funnel 204 where a data source is selected from the ship outputs. Instruction horn 202 also delivers destination selections to destination horn 206 where a ship is selected as a destination for the data. Data from the selected source ship is applied through source funnel 204, passing through trunk 208, to destination horn 206 where it is applied to the selected destination ship.

Stack 210 and associated FIFO 212 together can be considered a ship. In this embodiment, stack 210 is addressed as a destination of destination horn 206 for both push and pop operations, while associated FIFO 212 is addressed as a source for source funnel 204. Details of operation of stack 210 and FIFO 212 are given in conjunction with FIG. 3B below.

Memory Implemented as Destination

Figure 3A:
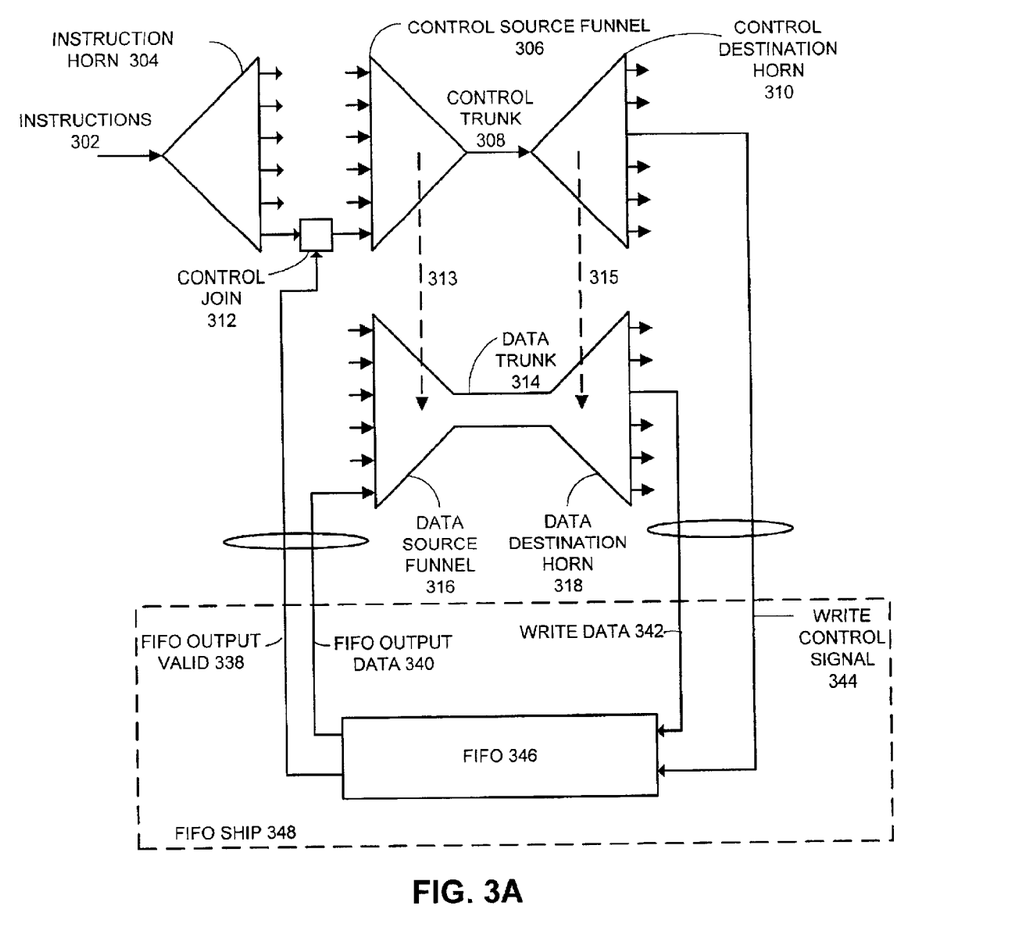
FIG. 3A illustrates details of FIFO 346 coupled to an asynchronous switch fabric in accordance with an embodiment of the present invention.

FIG. 3A illustrates details of FIFO 346 coupled to an asynchronous switch fabric in accordance with an embodiment of the present invention. The switch fabric operates as described below in conjunction with FIG. 3A and only the operation of FIFO ship 348 will be described here.

Write data 342 from data destination horn 318 and write control signal 344 from control destination horn 310 are bundled and arrive at FIFO ship 348 together. Write control signal 344 causes write data 342 to be written into FIFO 346. FIFO 346 supplies FIFO output data 340 and FIFO output valid 338 as bundled outputs from FIFO ship 348. FIFO output valid 338 is applied to control join 312 to await an instruction from instruction horn 304. When all input signals to control join 312 are supplied, FIFO output data 340 is moved through the switch fabric to the selected destination.

Figure 3B:
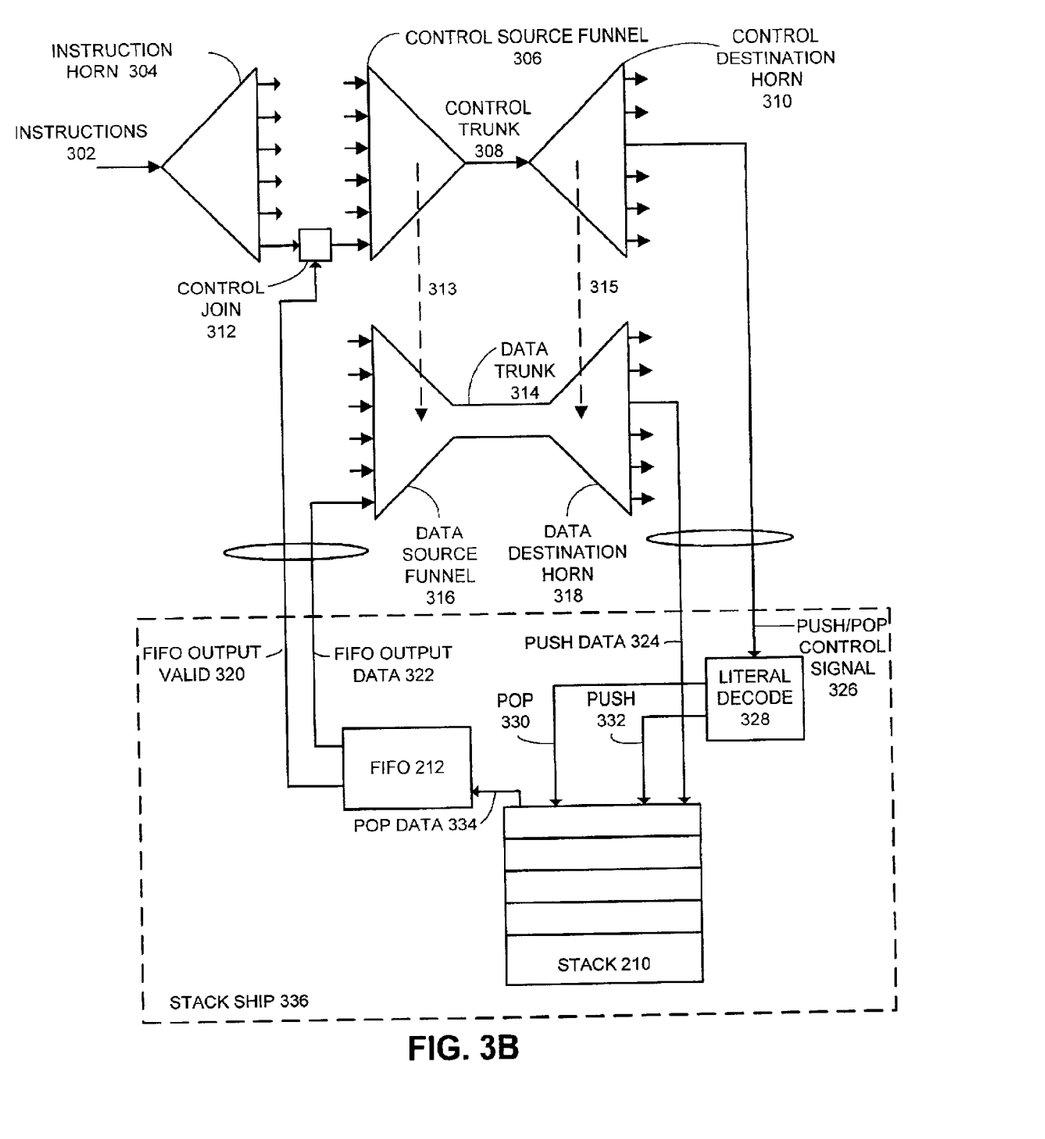
FIG. 3B illustrates details of stack 210 coupled to an asynchronous switch fabric in accordance with an embodiment of the present invention.

FIG. 3B illustrates details of stack 210 coupled to an asynchronous switch fabric in accordance with an embodiment of the present invention. In operation, instructions 302 are decoded in instruction horn 304 and supplied to a control join, such as control join 312, before being applied to control source funnel 306. Control join 312 joins two or more signals and supplies a control signal to control source funnel 306 after all input signals have arrived at control join 312.

Control source funnel 306 controls the selection of a data source and routing of data through data source funnel 316 via control lines 313. After selecting the proper source and the routing for data through data source funnel 316, control source funnel 306 passes destination control information through control trunk 308 to control destination horn 310. Data from data source funnel 316 is routed through data trunk 314 to data destination horn 318.

Control destination horn 310 controls the routing of data through data destination horn 318 and selection of output ports from data destination horn 318 via control lines 315. Control destination horn 310 also supplies various control signals to ships coupled to the output ports as described below and in conjunction with FIGS. 3B, 3C, and 5.

Stack ship 336 is a typical ship that can be coupled to the switch fabric. Stack ship 336 includes stack 210, literal decode 328, and FIFO 212. The following instructions perform the push and pop operations on stack 210:

push: mv A→stack(push)

pop: mv nil→stack(pop)

mv stack-FIFO→B

For the push operation, push data 324 and push/pop control signal 326 are bundled as indicated by the ellipse and arrive at stack ship 336 together. Literal decode 328 decodes push/pop control signal 326 and supplies push 332 to stack 210. Stack 210 then pushes push data 324 onto stack 210.

The pop operation includes two steps. The first step is coded similar to the push operation in that the instruction moves data to stack 210. However, the literal associated with the pop instruction indicates a pop operation rather than a push operation. Literal decode 328 decodes push/pop control signal 326 and generates pop 330. Push data 324 is ignored in this situation. Stack 210 supplies pop data 334 to FIFO 212.

The second instruction of the pop operation is to move FIFO output data 322 to the selected destination, destination B in the example. FIFO output data 322 is bundled with FIFO output valid 320 and both are delivered from stack ship 336. Note that the instruction pair that performs the pop action can be issued in either order. If the second instruction is issued first, completion of the instruction will wait for FIFO output valid 320 before continuing.

Figure 3C:
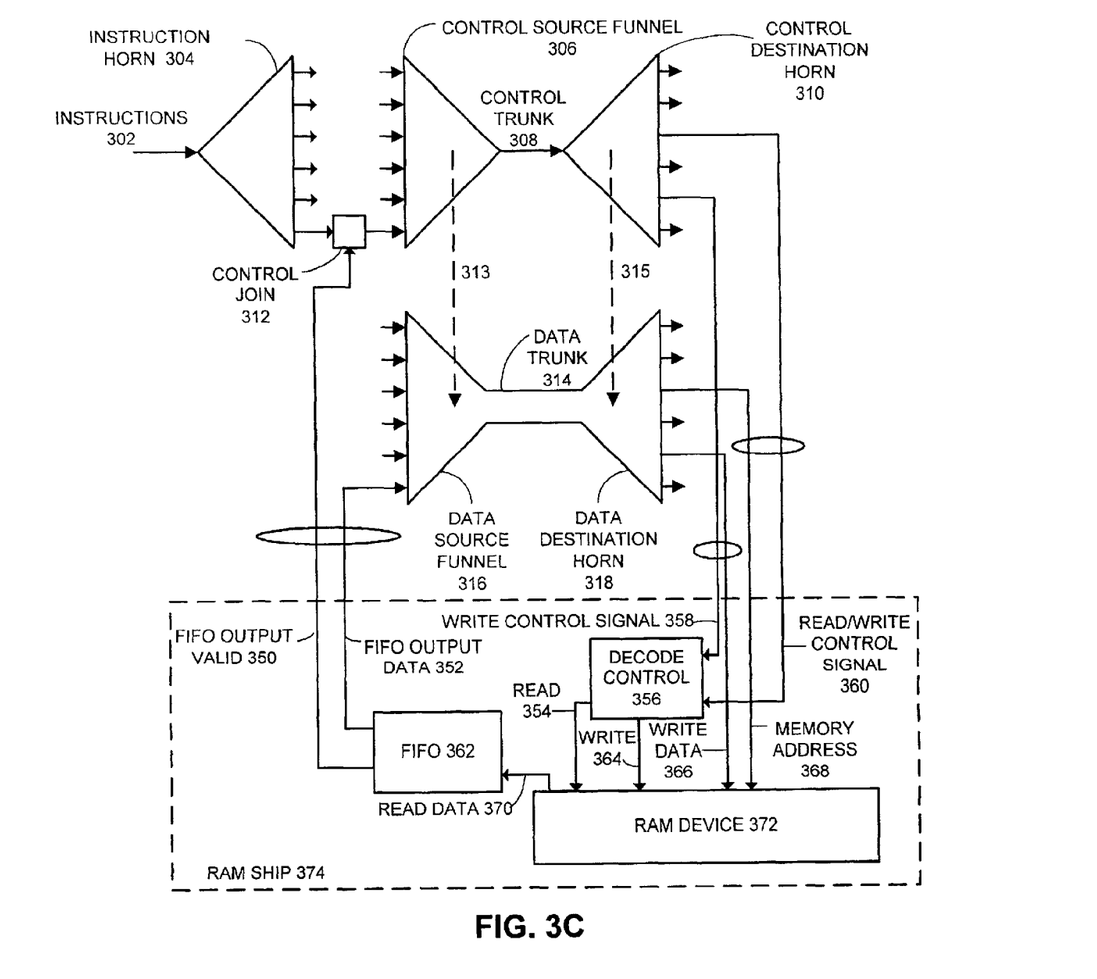
FIG. 3C illustrates details of RAM device 372 coupled to an asynchronous switch fabric in accordance with an embodiment of the present invention.

FIG. 3C illustrates details of RAM device 372 coupled to an asynchronous switch fabric in accordance with an embodiment of the present invention. The switch fabric operates as described above in conjunction with FIG. 3B and only the operation of RAM ship 374 will be described here.

RAM ship 374 includes RAM device 372, decode control 356 and FIFO 362. The following instructions perform write and read operations on RAM device 372:

write: mv A→RAM-address(write)

mv B→RAM-data read: mv C→RAM-address(read)

mv RAM-FIFO→D

The two instructions for the write can be issued in either order and the two instructions for the read can also be issued in either order. For the write operation, the first instruction causes memory address 368 and read/write control signal 360 to be applied to RAM ship 374. Memory address 368 and read/write control signal 360 are bundled and arrive at RAM ship 374 together. The second instruction causes write data 366 from source B and write control signal 358 to be applied to RAM ship 374. Write data 366 and write control signal 358 are bundled and arrive at RAM ship 374 together. Decode control 356 applies write 364 to RAM device 372 upon detecting when both write control signal 358 and read/write control signal 360 being set to write. RAM device 372 then writes write data 366 to the location specified by memory address 368.

For the read operation, the first instruction causes memory address 368 and read/write control signal 360 to be applied to RAM ship 374. Memory address 368 and read/write control signal 360 are bundled and arrive at RAM ship 374 together. Decode control 356 applies read 354 to RAM device 372. RAM device 372 supplies read data 370 from the location specified by memory address 368 to FIFO 362. FIFO 362 supplies FIFO output data 352 and FIFO output valid 350 as bundled signals to the switch fabric. The second instruction of the read supplies one of the signals to control join 312. Control join 312 joins this signal with FIFO output valid 350 to route FIFO output data 352 to the selected destination, destination C in this case.

Stack Coupled to Source Funnel

Figure 4:
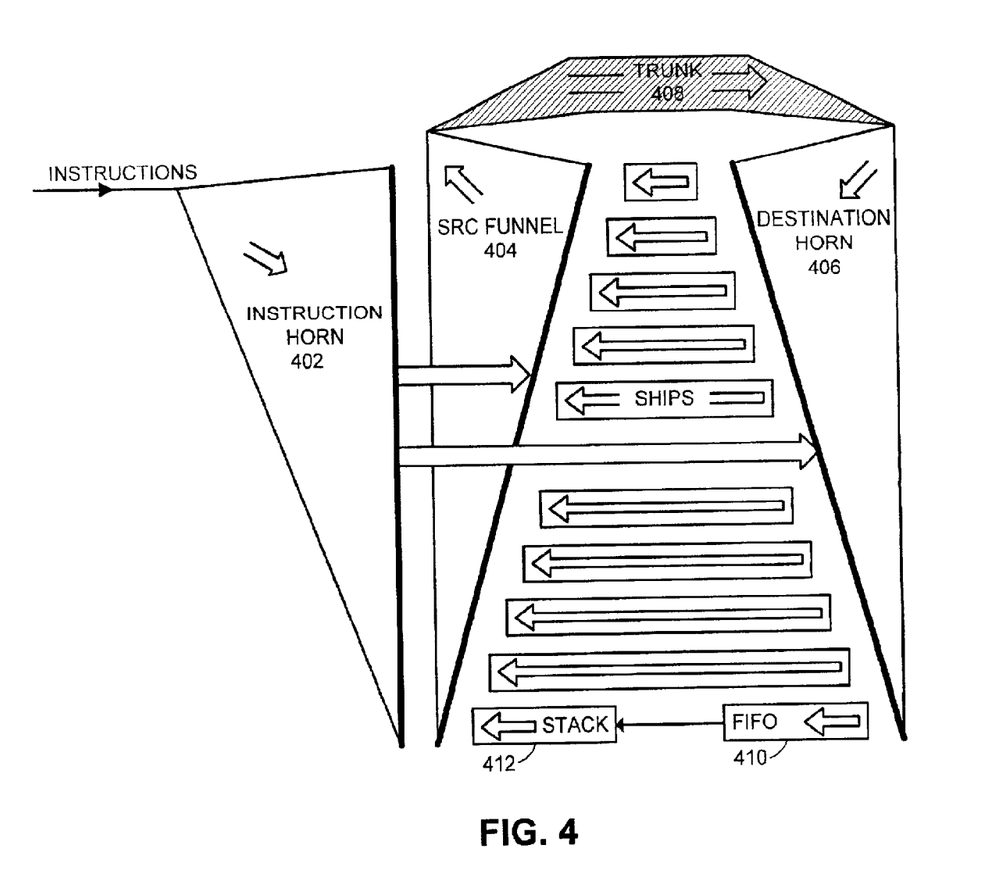
FIG. 4 illustrates stack 412 coupled to source funnel 404 in accordance with an embodiment of the present invention.

FIG. 4 illustrates stack 412 coupled to source funnel 404 in accordance with an embodiment of the present invention. The system includes three modules, instruction horn 402, source funnel 404, and destination horn 406. Processing elements, also called ships, are located between source funnel 404 and destination horn 406. In general, a ship can be any kind of element such as an adder, an accumulator, or as simple as a piece of wire. Trunk 408 couples source funnel 404 to destination horn 406.

In operation, instructions enter instruction horn 402 and are decoded. Instruction horn 402 delivers source selections to source funnel 404 where a data source is selected from the ship outputs. Instruction horn 402 also delivers destination selections to destination horn 406 where a ship is selected as a destination for the data. Data from the selected source ship is applied through source funnel 404, passing through trunk 408, to destination horn 406 where it is applied to the selected destination ship.

Stack 412 and associated FIFO 410 together can be considered a ship. In this embodiment, stack 412 is addressed as a source of source funnel 404 for both push and pop operations, while associated FIFO 410 is addressed as a destination for destination horn 406. Details of operation of stack 412 and FIFO 410 are given in conjunction with FIG. 5 below.

Stack Implemented as Source

Figure 5:
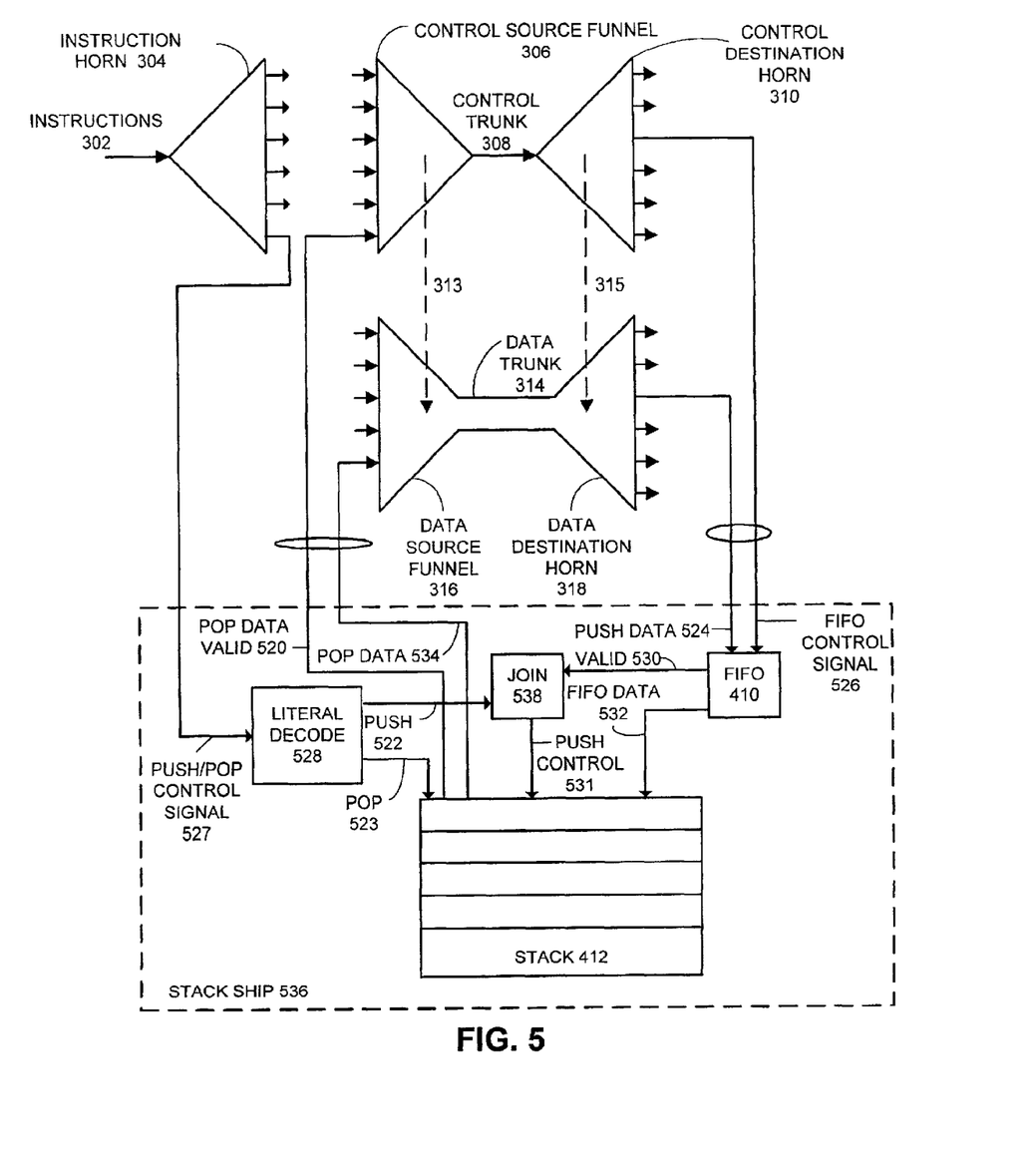
FIG. 5 illustrates details of stack 412 coupled to an asynchronous switch fabric in accordance with an embodiment of the present invention.

FIG. 5 illustrates details of stack 412 coupled to an asynchronous switch fabric in accordance with an embodiment of the present invention. The switch fabric operates as described above in conjunction with FIG. 3B and only the operation of stack ship 536 will be described here.

Stack ship 536 is a typical ship that can be coupled to the switch fabric. Stack ship 536 includes stack 412, literal decode 528, control join 538, and FIFO 410. The following instructions perform the push and pop operations on the stack:

push: mv C→stack-FIFO mv stack(push)→nil pop: mv stack(pop)→D

The first instruction for the push moves push data 524 from source C through data destination horn 318 to stack ship 536. FIFO control signal 526 is bundled with push data 524 and arrives at stack ship 536 at the same time. FIFO 410 stores push data 524 in response to FIFO control signal 526. After push data 524 has been stored, FIFO 410 supplies FIFO data 532 to stack 412 and valid 530 to control join 538.

The second instruction of the push operation causes instruction horn 304 to supply push/pop control signal 527 to literal decode 528. Literal decode 528 then supplies push 522 to control join 538. Control join 538 supplies push control 531 to stack 412 in response to both push 522 and valid 530 being supplied. In response to push control 531, stack 412 stores FIFO data 532.

The pop instruction causes instruction horn 304 to supply push/pop control signal 527 to literal decode 528. Literal decode 528 applies pop 523 to stack 412. Stack 412, in turn, supplies bundled pop data 534 and pop data valid 520 to data source funnel 316 and control source funnel 306, respectively. Data source funnel 316 and control source funnel 306 work together to deliver pop data 534 to destination D.

Processing for Stack Coupled to Destination Horn

Figure 6:
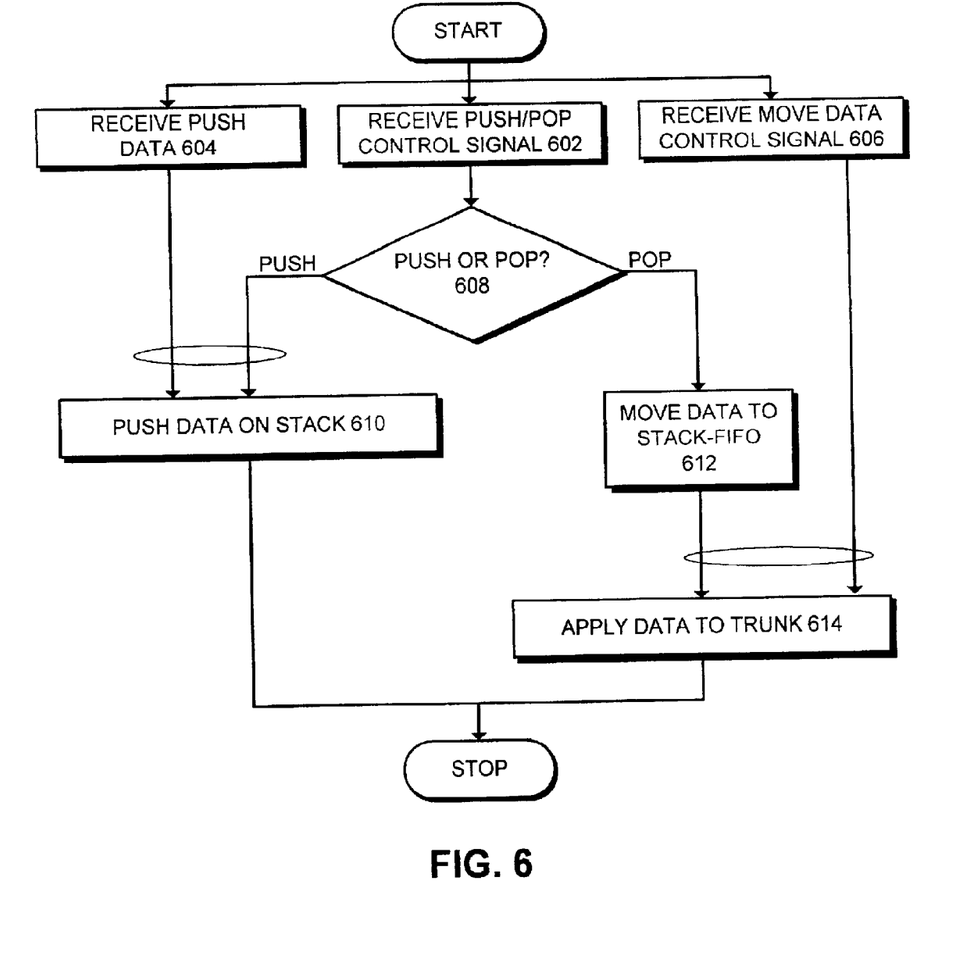
FIG. 6 is a flowchart illustrating the processing of instructions for stack 210 coupled to control destination horn 310 in accordance with an embodiment of the present invention.

FIG. 6 is a flowchart illustrating the processing of instructions for stack 210 coupled to control destination horn 310 as illustrated in FIG. 3B in accordance with an embodiment of the present invention. The system starts when control destination horn 310 receives a stack request from instruction horn 304 (step 602). If the stack request is a push instruction, stack 210 receives data bundled with the push control signal (step 604). Next, literal decode 328 supplies push 332 to stack 210 (step 608). Stack 210 pushes push data 324 onto the stack in response to push 332 ending the push operation (step 610).

If the stack request is a pop operation at 608, literal decode 328 supplies pop 330 to stack 210. Stack 210, pops pop data 334 into FIFO 212 in response. FIFO 212 then supplies FIFO output data 322 to data source funnel 316 and FIFO output valid 320 to control join 312 (step 612). The second instruction of the pop sequence causes control join 312 to receive its second signal from instruction horn 304 (step 606). In response, FIFO output data 322 is supplied through data trunk 314 to the proper destination ending the pop operation (step 614).

Processing for Stack Coupled to Source Funnel

Figure 7:
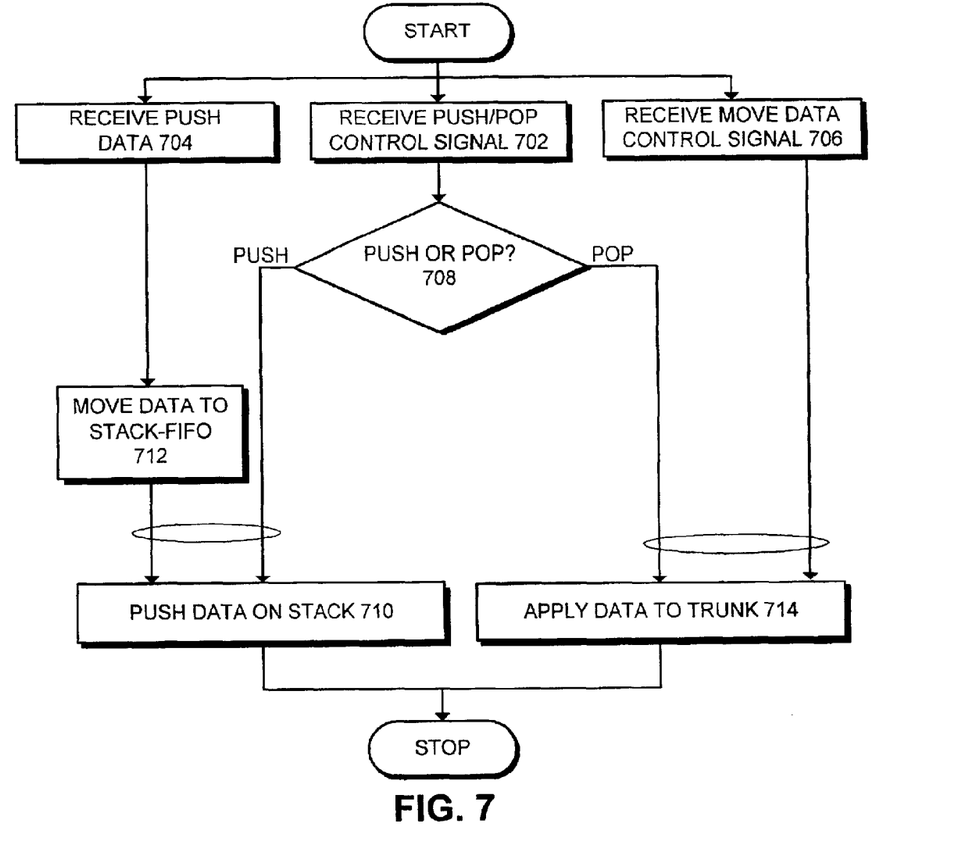
FIG. 7 is a flowchart illustrating the processing of instructions for stack 412 coupled to source funnel 404 in accordance with an embodiment of the present invention.

FIG. 7 is a flowchart illustrating the processing of instructions for stack 412 coupled to source funnel 404 as illustrated in FIGS. 4 and 5 in accordance with an embodiment of the present invention. The system starts when FIFO 410 receives bundled push data 524 and FIFO control signal 526 from data destination horn 318 and control destination horn 310 respectively (step 704). In response, FIFO 410 stores the data and supplies FIFO data 532 to stack 412 and valid 530 to control join 538 (step 712). Next, literal decode 528 receives push/pop control signal 527 from instruction horn 304 (step 702). Next, decode literal supplies push 522 to control join 538 (step 708). Control join 538 supplies push control 531 to stack 412 in response to both push 522 an valid 530 being applied simultaneously. Stack 412 pushes FIFO data 532 in response to push control 531 ending the push operation (step 710).

If the instruction is a pop instruction at 708, instruction horn 304 supplies push/pop control signal 527 to literal decode 528 (step 706). Literal decode 528, in turn, supplies pop 523 to stack 412. Stack 412 pops pop data 534 to data source funnel 316 and pop data valid 520 to control source funnel 306. Data source funnel 316 supplies pop data 534 to the selected destination through data trunk 314 ending the pop operation (step 714).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that facilitates implementing a memory mechanism within an asynchronous switch fabric, comprising:
   a memory device, wherein the memory device has other than first-in, first-out semantics including one of a random access memory and a stack;
   a data destination horn, for routing data from a trunk line to a plurality of destinations, wherein the memory device is a destination of the plurality of destinations; and
   a data source funnel, for routing data from a plurality of sources into the trunk line, wherein the memory device is a source of the plurality of sources;
   wherein the apparatus converts the memory device with other than first-in, first-out semantics to into a dual-port device with first-in, first-out semantics, wherein read/write order hazards are avoided by assigning read and write control to a single port of the dual-port device.

2. The apparatus of claim 1, further comprising:
   an asynchronous control structure coupled to the data destination horn, that is configured to control propagation of data through the data destination horn;
   wherein the asynchronous control structure is additionally coupled to the data source funnel, and is additionally configured to control propagation of data through the data source funnel;
   wherein the asynchronous control structure uses a destination address associated with the data destination horn for the memory device to control propagation of data to the memory device; and
   wherein the asynchronous control structure uses the destination address for the memory device to control propagation of data from the memory device.

3. The apparatus of claim 2, wherein a read address for the memory device is shared as a write address of the data destination horn for the memory device, so that an order of memory operations for the memory device is identical to an instruction order for the memory device.

4. The apparatus of claim 3, wherein a literal value associated with an instruction for the memory device can specify one of a write operation and a read operation.

5. The apparatus of claim 4, further comprising a first-in, first-out storage structure interposed between the memory device and the data source funnel so that data delivered from the memory device during the read operation will be available to the data source funnel in a same order as delivered from the memory device.

6. The apparatus of claim 1, further comprising:
   an asynchronous control structure coupled to the data destination horn, that is configured to control propagation of data through the data destination horn;
   wherein the asynchronous control structure is additionally coupled to the data source funnel, and is additionally configured to control propagation of data through the data source funnel;
   wherein the asynchronous control structure uses a source address associated with the data source funnel for the memory device to control propagation of data to the memory device; and
   wherein the asynchronous control structure uses the source address for the memory device to control propagation of data from the memory device.

7. The apparatus of claim 6, wherein a write address for the memory device is shared as a read address of the data source funnel for the memory device, so that an order of memory operations for the memory device is identical to an instruction order for the memory device.

8. The apparatus of claim 7, wherein a literal value associated with an instruction for the memory device can specify one of a write operation and a read operation.

9. The apparatus of claim 8, further comprising a first-in, first-out storage structure interposed between the data destination horn and the memory device so that data delivered from the data destination horn during the write operation will be available to the memory device in a same order as delivered from the data destination horn.

10. A computing system that facilitates implementing a memory mechanism within an asynchronous switch fabric, comprising:
 a memory device, wherein the memory device has other than first-in, first-out semantics including one of a random access memory and a stack;
 a data destination horn, for routing data from a trunk line to a plurality of destinations, wherein the memory device is a destination of the plurality of destinations; and
 a data source funnel, for routing data from a plurality of sources into the trunk line, wherein the memory device is a source of the plurality of sources;
 wherein the apparatus converts the memory device with other than first-in, first-out semantics to into a dual-port device with first-in, first-out semantics, wherein read/write order hazards are avoided by assigning read and write control to a single port of the dual-port device.

11. The computing system of claim 10, further comprising:
 an asynchronous control structure coupled to the data destination horn, that is configured to control propagation of data through the data destination horn;
 wherein the asynchronous control structure is additionally coupled to the data source funnel, and is additionally configured to control propagation of data through the data source funnel;
 wherein the asynchronous control structure uses a destination address associated with the data destination horn for the memory device to control propagation of data to the memory device; and
 wherein the asynchronous control structure uses the destination address for the memory device to control propagation of data from the memory device.

12. The computing system of claim 11, wherein a read address for the memory device is shared as a write address of the data destination horn for the memory device, so that an order of memory operations for the memory device is identical to an instruction order for the memory device.

13. The computing system of claim 12, wherein a literal value associated with an instruction for the memory device can specify one of a write operation and a read operation.

14. The computing system of claim 13, further comprising a first-in, first-out storage structure interposed between the memory device and the data source funnel so that data delivered from the memory device during the read operation will be available to the data source funnel in a same order as delivered from the memory device.

15. The computing system of claim 10, further comprising:
 an asynchronous control structure coupled to the data destination horn, that is configured to control propagation of data through the data destination horn;
 wherein the asynchronous control structure is additionally coupled to the data source funnel, and is additionally configured to control propagation of data through the data source funnel;
 wherein the asynchronous control structure uses a source address associated with the data source funnel for the memory device to control propagation of data to the memory device; and
 wherein the asynchronous control structure uses the source address for the memory device to control propagation of data from the memory device.

16. The computing system of claim 15, wherein a write address for the memory device is shared as a read address of the data source funnel for the memory device, so that an order of memory operations for the memory device is identical to an instruction order for the memory device.

17. The computing system of claim 16, wherein a literal value associated with an instruction for the memory device can specify one of a write operation and a read operation.

18. The computing system of claim 17, further comprising a first-in, first-out storage structure interposed between the data destination horn and the memory device so that data delivered from the data destination horn during the write operation will be available to the memory device in a same order as delivered from the data destination horn.

19. A method for implementing a memory mechanism within an asynchronous switch fabric, wherein the memory mechanism is a memory device with other than first-in, first-out semantics including one of a random access memory and a stack, comprising:
 accepting data from a trunk line to a data destination horn;
 routing data to a plurality of destinations from the data destination horn, wherein the memory device is a destination of the plurality of destinations;
 addressing the memory device using a destination address within an asynchronous control structure, wherein the destination address is used to store data in the memory device and to recover data from the memory device;
 decoding an additional address bit to select one of a memory read and a memory write;
 providing data to a first-in, first-out storage structure from the memory device;
 receiving data from the first-in, first-out storage structure at a data source funnel; and
 applying data from the data source funnel to the trunk line;
 wherein the method converts the memory device with other than first-in, first-out semantics to into a dual-port device with first-in, first-out semantics, wherein read/write order hazards are avoided by assigning read and write control to a single port of the dual-port device.

20. A method for implementing a memory mechanism within an asynchronous switch fabric, wherein the memory mechanism includes a memory device with other than first-in, first-out semantics, comprising:
 accepting data from a trunk line to a data destination horn;
 routing data to a plurality of destinations from the data destination horn, wherein a first-in, first-out storage structure is a destination of the plurality of destinations;
 providing data to the memory device from the first-in, first-out storage structure;
 addressing the memory device using a source address within an asynchronous control structure, wherein the source address is used to store data in the memory device and to recover data from the memory device;
 decoding an additional address bit to select one of a memory read and a memory write;
 receiving data from the memory device at a data source funnel; and
 applying data from the data source funnel to the trunk line;
 wherein the method converts the memory device with other than first-in, first-out semantics to into a dual-port device with first-in, first-out semantics, wherein read/write order hazards are avoided by assigning read and write control to a single port of the dual-port device.

* * * * *